US012288892B2

(12) United States Patent
Komatsu

(10) Patent No.: US 12,288,892 B2
(45) Date of Patent: Apr. 29, 2025

(54) VEHICLE BATTERY PACK

(71) Applicant: HONDA MOTOR CO., LTD., Tokyo (JP)

(72) Inventor: Daigo Komatsu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/373,000

(22) Filed: Sep. 26, 2023

(65) Prior Publication Data

US 2024/0106056 A1 Mar. 28, 2024

(30) Foreign Application Priority Data

Sep. 28, 2022 (JP) .................................. 2022-155439

(51) Int. Cl.
*B60K 1/04* (2019.01)
*B60L 50/64* (2019.01)
(Continued)

(52) U.S. Cl.
CPC ........... *H01M 50/249* (2021.01); *B60L 50/64* (2019.02); *B60L 58/26* (2019.02); *H01M 50/204* (2021.01); *H01M 50/244* (2021.01)

(58) Field of Classification Search
CPC .... B60K 1/04; H01M 50/204; H01M 50/244; H01M 50/249; B60L 50/64; B60L 58/26
See application file for complete search history.

(56) References Cited

U.S. PATENT DOCUMENTS 8,820,455 B2 * 9/2014 Nitawaki ................ B60L 50/64
180/68.5
8,859,126 B2 * 10/2014 Yamada ................ H01M 10/66
429/153

(Continued)

FOREIGN PATENT DOCUMENTS

JP    2007-294290 A    11/2007
JP    2016-135621 A    7/2016

(Continued)

OTHER PUBLICATIONS

Apr. 2, 2024, Translation of Japanese Office Action issued for related JP Application No. 2022-155439.

(Continued)

*Primary Examiner* — Jason D Shanske
*Assistant Examiner* — James J Triggs
(74) *Attorney, Agent, or Firm* — Paratus Law Group, PLLC

(57) ABSTRACT

A vehicle battery pack includes a battery module, a battery case configured to accommodate the battery module, and a battery cooling mechanism configured to cool the battery module. The battery cooling mechanism includes an introduction duct configured to introduce air into the battery case, an air guide member configured to guide the air, an air guide fan configured to blow the air, and a discharge duct configured to discharge the air to the outside. The air guide fan includes a fan motor, a fan case including a suction port and an air blow-out port, and an impeller. The air guide member is provided so that one end thereof is connected to the introduction duct and another end thereof seals a front surface of the battery module. The air guide fan faces the battery module in a front-rear direction, and is disposed so that the suction port faces rearward.

10 Claims, 7 Drawing Sheets

(51) Int. Cl.
   *B60L 58/26* (2019.01)
   *H01M 50/204* (2021.01)
   *H01M 50/244* (2021.01)
   *H01M 50/249* (2021.01)

(56) References Cited

U.S. PATENT DOCUMENTS

| | | | | |
|---|---|---|---|---|
| 9,991,570 | B2* | 6/2018 | Tanaka | H01M 10/625 |
| 10,272,796 | B2* | 4/2019 | Kouno | B60K 1/04 |
| 2013/0192914 | A1* | 8/2013 | Nakamori | B60L 50/64 |
| | | | | 180/68.5 |
| 2013/0266840 | A1* | 10/2013 | Fujii | H01M 10/613 |
| | | | | 429/120 |
| 2016/0294026 | A1* | 10/2016 | Tsuchiya | H01M 10/625 |
| 2017/0096079 | A1* | 4/2017 | Yokote | B60K 1/00 |
| 2018/0050608 | A1* | 2/2018 | Hu | B60L 15/10 |
| 2018/0083326 | A1* | 3/2018 | Yokote | B60L 58/27 |
| 2020/0194750 | A1 | 6/2020 | Kawano | |
| 2022/0173456 | A1 | 6/2022 | Komatsu | |
| 2022/0363378 | A1* | 11/2022 | Schlak | B64C 29/0025 |
| 2024/0229978 | A1* | 7/2024 | Komatsu | H01M 10/613 |
| 2024/0308394 | A1* | 9/2024 | Takai | B60L 50/66 |

FOREIGN PATENT DOCUMENTS

| | | |
|---|---|---|
| JP | 2017-024480 A | 2/2017 |
| JP | WO2019/021779 A1 | 1/2019 |
| JP | 2022-088087 A | 6/2022 |
| JP | 2022-103536 A | 7/2022 |

OTHER PUBLICATIONS

Apr. 2, 2024, Japanese Office Action issued for related JP Application No. 2022-155439.

* cited by examiner

VEHICLE BATTERY PACK

CROSS-REFERENCE TO RELATED APPLICATIONS

This application is based on and claims priority under 35 USC 119 from Japanese Patent Application No. 2022-155439 filed on Sep. 28, 2022, which is hereby incorporated by reference in its entirety.

TECHNICAL FIELD

The present invention relates to a vehicle battery pack mounted on an electric vehicle or the like.

BACKGROUND ART

In recent years, researches and developments have been conducted on a secondary battery which contributes to improvement in energy efficiency in order to allow more people to have access to affordable, reliable, sustainable and advanced energy.

In a technique related to a secondary battery, for example, JP2017-024480A discloses a vehicle battery pack mounted on a vehicle. The vehicle battery pack disclosed in Patent Literature 1 includes a battery, a case and a cover that accommodate the battery, and a battery cooling mechanism that cools the battery, and the battery is disposed behind a seat. In the vehicle battery pack disclosed in Patent Literature 1, the battery cooling mechanism includes an introduction duct that introduces air from outside into a battery accommodation space surrounded by the case and the cover, and an air guide fan disposed inside the battery accommodation space.

However, in the vehicle battery pack disclosed in JP2017-024480A, an intake port of the introduction duct that takes in air from the outside is disposed beside or below the seat to face a front side of the vehicle. Therefore, there is a problem that the intake port of the introduction duct is disposed at a position close to an occupant seated in the seat, and noise of the air guide fan is easily transmitted to the occupant seated in the seat via the introduction duct. On the other hand, when a dedicated component is provided to reduce the transmission of the noise of the air guide fan to the occupant, the number of components increases and a manufacturing cost increases.

SUMMARY

The present invention provides a vehicle battery pack that is capable of reducing transmission of noise of an air guide fan to an occupant without increasing the number of components, and further contributes to improvement in energy efficiency.

According to an aspect of the present disclosure, there is provided a vehicle battery pack comprising: a battery module in which a plurality of battery cells are stacked: a battery case configured to accommodate the battery module; and a battery cooling mechanism configured to cool the battery module, wherein the vehicle battery pack is mounted on a vehicle provided with at least one seat, the battery case is mounted behind the seat, the battery cooling mechanism includes; an introduction duct configured to introduce air from an outside of the battery case into the battery case; an air guide member disposed inside the battery case and configured to guide, to the battery module, the air introduced into the battery case from the introduction duct: an air guide fan configured to blow air inside the battery case; and a discharge duct configured to discharge the air inside the battery case to the outside of the battery case, the air guide fan includes a fan motor, a fan case including a suction port and an air blow-out port, and an impeller rotatably disposed inside the fan case and configured to be rotated by a driving force of the fan motor, the introduction duct is disposed in front of the battery module, the air guide member is provided so that one end thereof is connected to the introduction duct and another end thereof seals a front surface of the battery module, and the air guide fan is disposed behind the battery module, faces the battery module in a front-rear direction, and is disposed so that the suction port faces rearward.

According to the present invention, it is possible to reduce transmission of noise of an air guide fan to an occupant without increasing the number of components and further contribute to improvement in energy efficiency.

DESCRIPTION OF EMBODIMENTS

Figure 1:
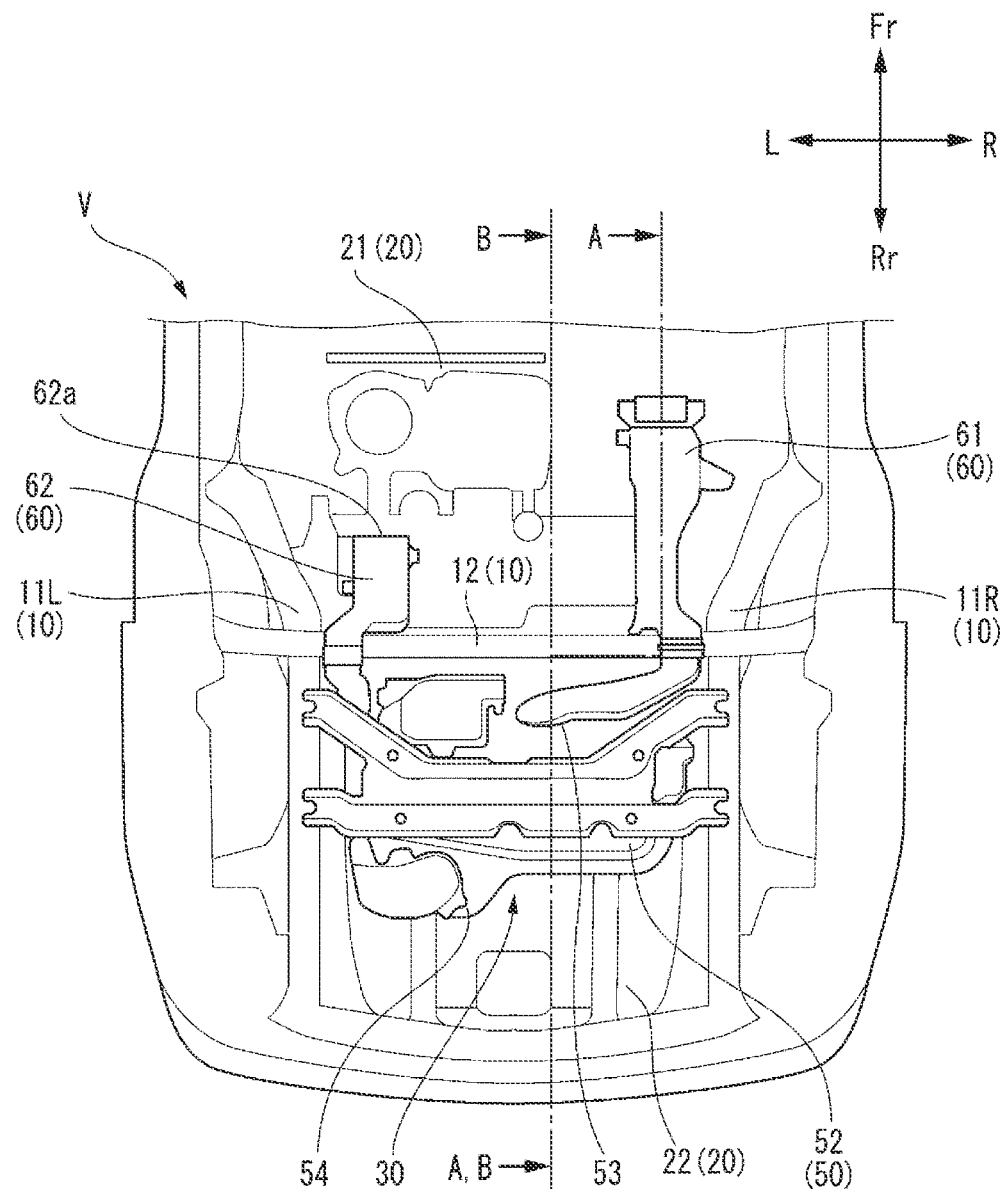
FIG. 1 is a top view of a main portion of a vehicle body rear portion of a vehicle on which a vehicle battery pack according to an embodiment of the present invention is mounted, as viewed from above.

Hereinafter, an embodiment of a vehicle battery pack according to the present invention will be described with reference to the accompanying drawings. Note that the drawings are viewed in directions of reference numerals. In addition, in the present description and the like, for the sake of simplicity and clarity of explanation, a front-rear direction, a left-right direction, and an up-down direction are described according to directions viewed from a driver of a vehicle on which the vehicle battery pack is mounted, and in the drawings, a front side of the vehicle is represented by Fr, a rear side is represented by Rr, a left side is represented by L, a right side is represented by R, an upper side is represented by U, and a lower side is represented by D.

<Vehicle>

First, a vehicle V on which the vehicle battery pack according to the embodiment of the present invention is mounted will be described. The vehicle V may be, for example, an electric vehicle on which an electric motor (not shown) is mounted and which travels by a driving force of the electric motor, or may be a hybrid vehicle on which an electric motor (not shown) and an internal combustion engine (not shown) are mounted and which travels by a driving force of both or one of the electric motor and the internal combustion engine.

Figure 2:
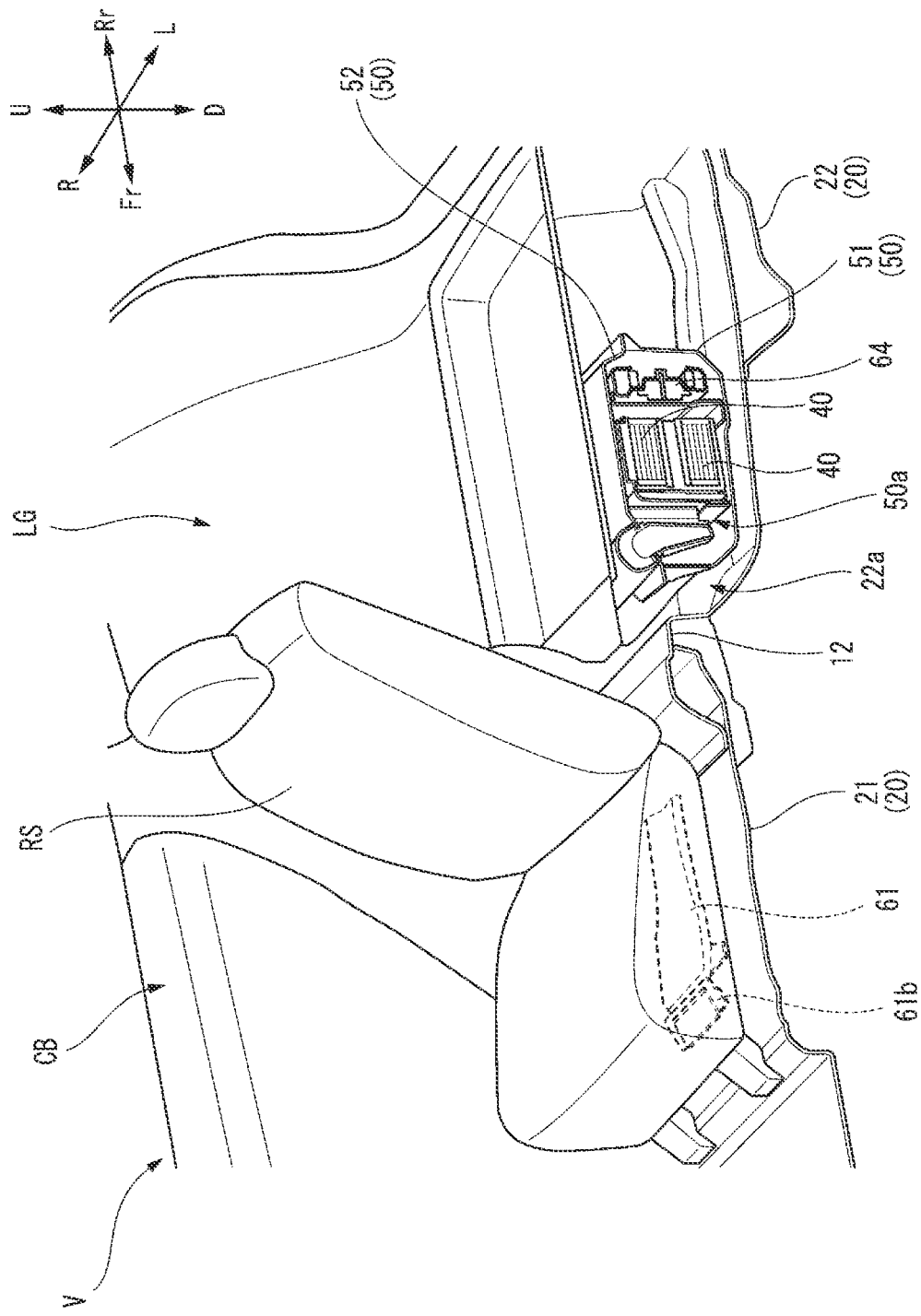
FIG. 2 is a perspective view of a battery module in FIG. 1 as viewed obliquely from below.

As shown in FIGS. 1 and 2, the vehicle V includes a vehicle body frame 10 that forms a framework of a vehicle body lower portion. The vehicle body frame 10 includes a left side sill 11L and a right side sill 11R extending in the front-rear direction in the vicinity of left and right ends of the vehicle V, and a cross member 12 extending in the left-right direction and connecting the left side sill 11L and the right side sill 11R. In the present embodiment, at least one cross member 12 extends in the left-right direction behind a rear seat RS.

The vehicle V includes a floor panel 20 supported by the vehicle body frame 10 and forming a floor portion of the vehicle V. The floor panel 20 includes a front floor panel portion 21 forming a floor portion of a vehicle compartment CB, and a rear floor panel portion 22 forming a floor portion below the rear seat RS and a floor portion of a rear cargo compartment LG. The rear seat RS is supported on a front upper portion of the rear floor panel portion 22.

An accommodation recess 22a that accommodates a battery pack 30 is formed in the rear floor panel portion 22 below the rear cargo compartment LG.

<Battery Pack>

Figure 3:
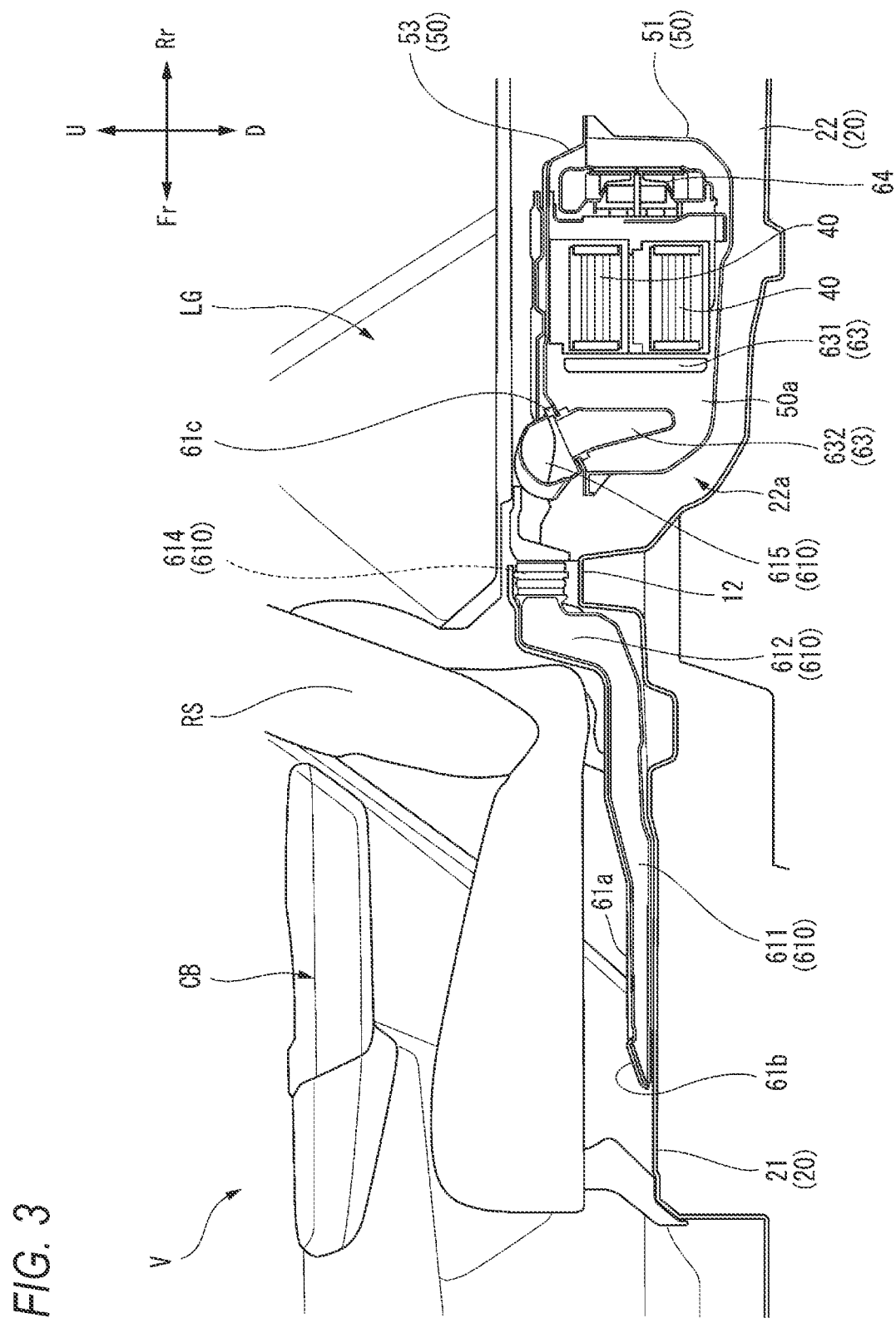
FIG. 3 is a cross-sectional view taken along line A-A in FIG. 1.
Figure 4:
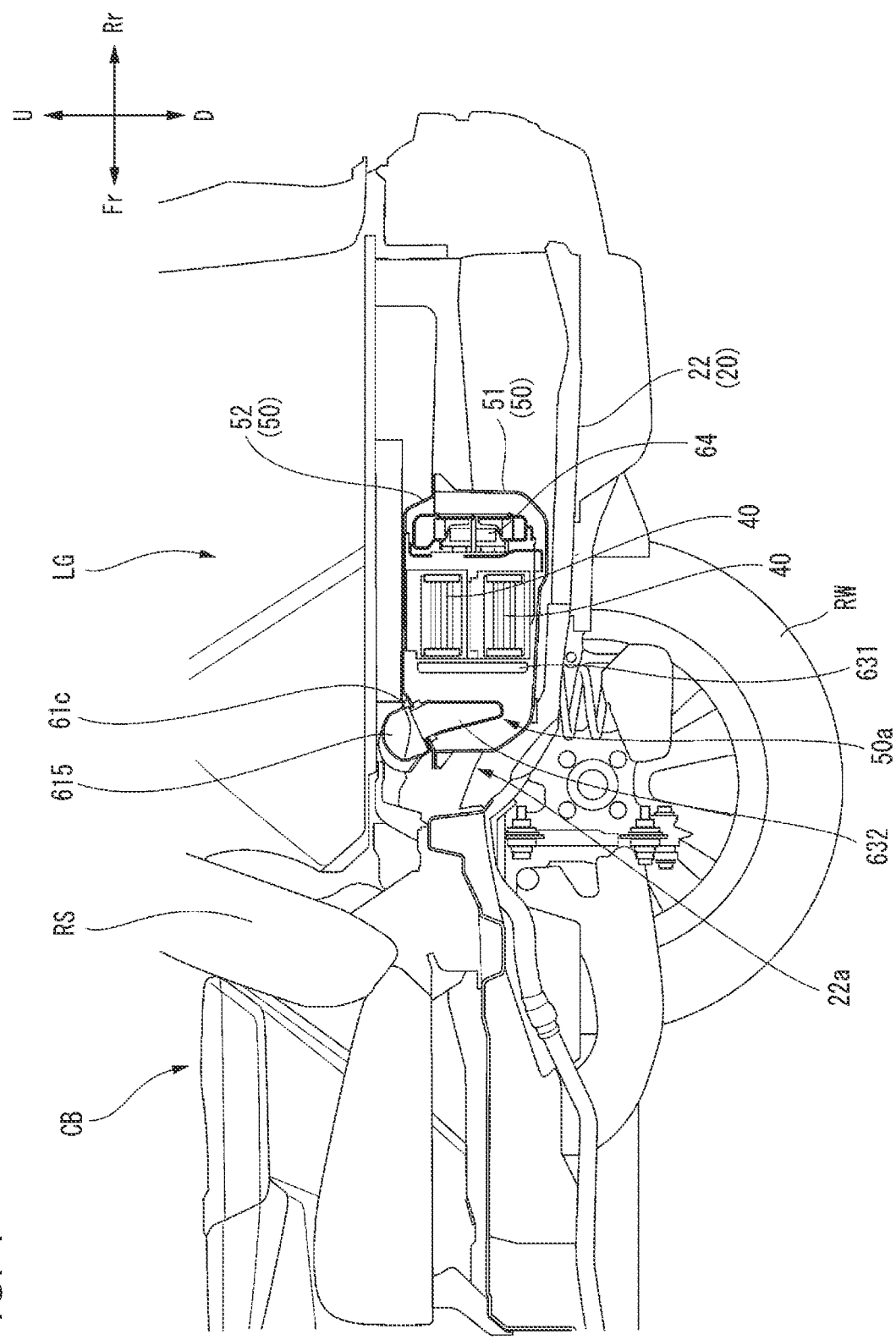
FIG. 4 is a cross-sectional view taken along line B-B in FIG. 1.
Figure 5:
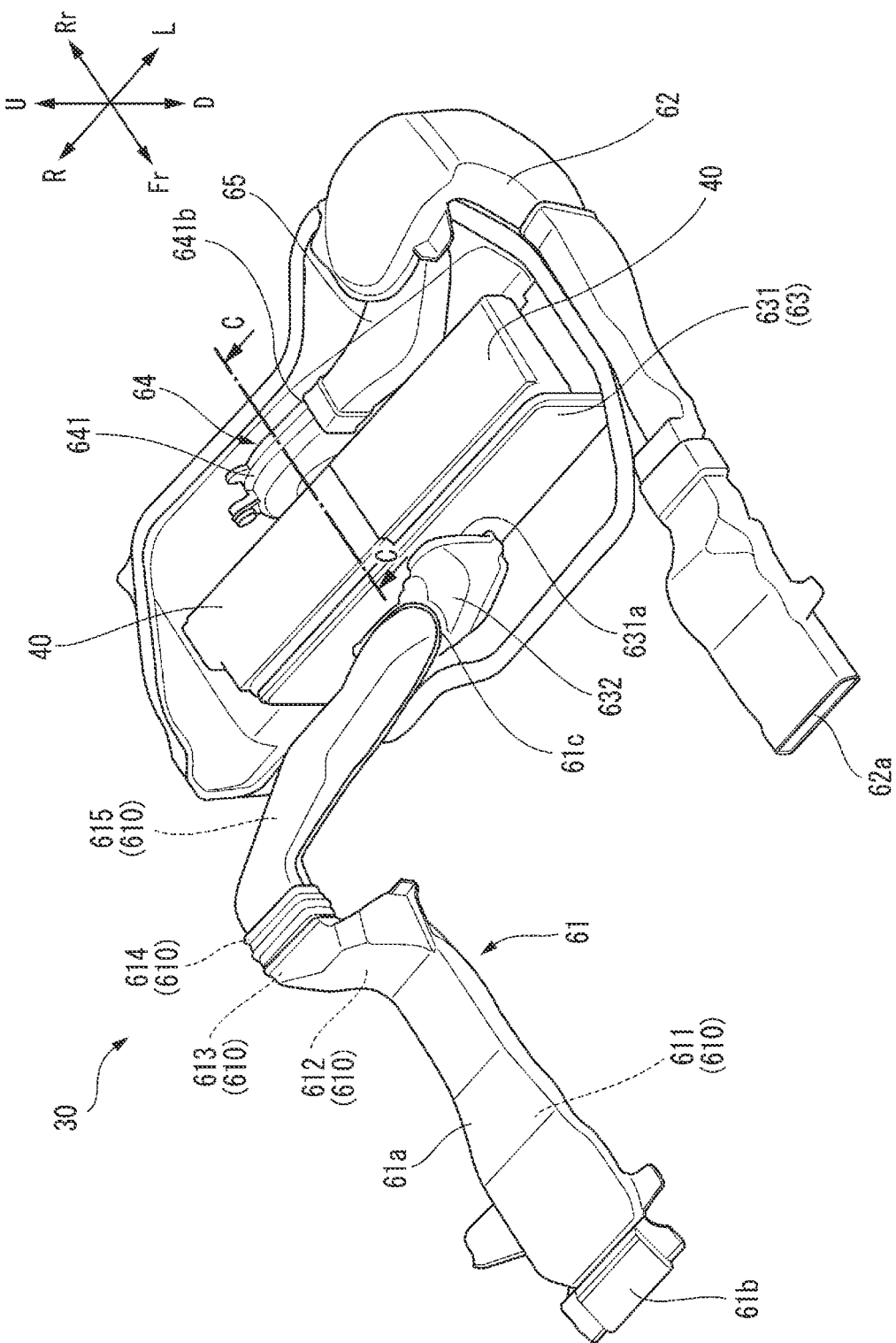
FIG. 5 is a perspective view of the vehicle battery pack according to the embodiment of the present invention in a state in which a cover is removed

As shown in FIGS. 3 to 5, the battery pack 30 includes a battery module 40 in which a plurality of battery cells are stacked, a battery case 50 that accommodates the battery module 40, and a battery cooling mechanism 60 that cools the battery module 40.

In the battery pack 30, the battery case 50 in which the battery module 40 is accommodated is disposed in the accommodation recess 22a provided in the rear floor panel portion 22. Therefore, the battery pack 30 is mounted on the vehicle V so that the battery module 40 is located behind the rear seat RS.

In the present embodiment, the battery pack 30 includes four battery modules 40. Each battery module 40 has a substantially rectangular parallelepiped shape, and is disposed so that a longitudinal direction thereof extends in a vehicle width direction. The four battery modules 40 are disposed in the battery case 50, two side by side in the left-right direction and two side by side in the upper-lower direction.

A gap portion SP extending in the upper-lower direction is formed between the battery modules 40 disposed side by side in the upper-lower direction.

The battery case 50 includes a case body 51 that accommodates the four battery modules 40 and whose upper portion is opened, and a cover 52 covering an opening of the upper portion of the case body 51. The case body 51 and the cover 52 are sealed. A battery accommodation space 50a surrounded by the case body 51 and the cover 52 is formed in the battery case 50. The four battery modules 40 are accommodated in the battery accommodation space 50a.

The cover 52 is formed with an introduction-side opening 53 and a discharge-side opening 54. The introduction-side opening 53 and the discharge-side opening 54 are openings formed in the cover 52. The introduction-side opening 53 is formed in a front left-right center region of the cover 52. The discharge-side opening 54 is formed in a left rear region of the cover 52. An introduction duct 61 of the battery cooling mechanism 60 to be described later is connected to the introduction-side opening 53. A discharge duct 62 of the battery cooling mechanism 60 to be described later is connected to the discharge-side opening 54

<Battery Cooling Mechanism>

The battery cooling mechanism 60 includes the introduction duct 61 that introduces air from the outside of the battery case into the battery case 50, and the discharge duct 62 that discharges air inside the battery case 50 to the outside of the battery case. Further, the battery cooling mechanism 60 includes an introduction-side air guide member 63 that guides, to the battery module 40, the air introduced from the introduction duct 61 into the battery case 50, an air guide fan 64 that blows the air inside the battery case 50, and a discharge-side air guide member 65 that guides the air blown from the air guide fan 64 to the discharge duct 62. The introduction duct 61 is disposed in front of the battery case 50, that is, in front of the four battery modules 40. The introduction-side air guide member 63, the air guide fan 64, and the discharge-side air guide member 65 are disposed inside the battery case 50.

The introduction duct 61 has a cylindrical shape, and includes an air guide portion 61a that forms an air flow path 610, an intake port 61b that is formed at one end of the air guide portion 61a and takes in air from the outside of the battery case into the air flow path 610, and a supply port 61c that is formed at the other end of the air guide portion 61a and supplies, to the inside of the battery case 50, the air taken in from the intake port 61b and flowing through the air flow path 610.

The intake port 61b is located below the rear seat RS and faces obliquely forward and upward. The supply port 61c is connected to the introduction-side opening 53 formed in the cover 52 of the battery case 50.

Therefore, air in the vehicle compartment CB of the vehicle V is taken into the air flow path 610 from the intake port 61b of the introduction duct 61. The air taken into the air flow path 610 from the intake port 61b passes through the air flow path 610, and is supplied from the supply port 61c to the inside of the battery case 50 through the introduction-side opening 53 formed in the cover 52 of the battery case 50.

The introduction-side air guide member 63 includes a supply portion 631 that covers front surfaces of the four battery modules 40 and a cylindrical guide portion 632.

The supply portion 631 seals the front surface of each battery module 40. An opening 631a is formed in the supply portion 631. One end of the cylindrical guide portion 632 is connected to the introduction-side opening 53 formed in the cover 52 of the battery case 50, and the other end is connected to the opening 631a of the supply portion 631.

In this way, one end of the introduction-side air guide member 63 is connected to the introduction duct 61 via the introduction-side opening 53 formed in the cover 52 of the battery case 50, and the other end of the introduction-side air guide member 63 seals the front surface of the battery module 40.

Therefore, air introduced into the battery case 50 from the introduction-side opening 53 formed in the cover 52 of the battery case 50 is supplied to the front surfaces of the four battery modules 40 from the supply portion 631 through the guide portion 632.

Figure 6:
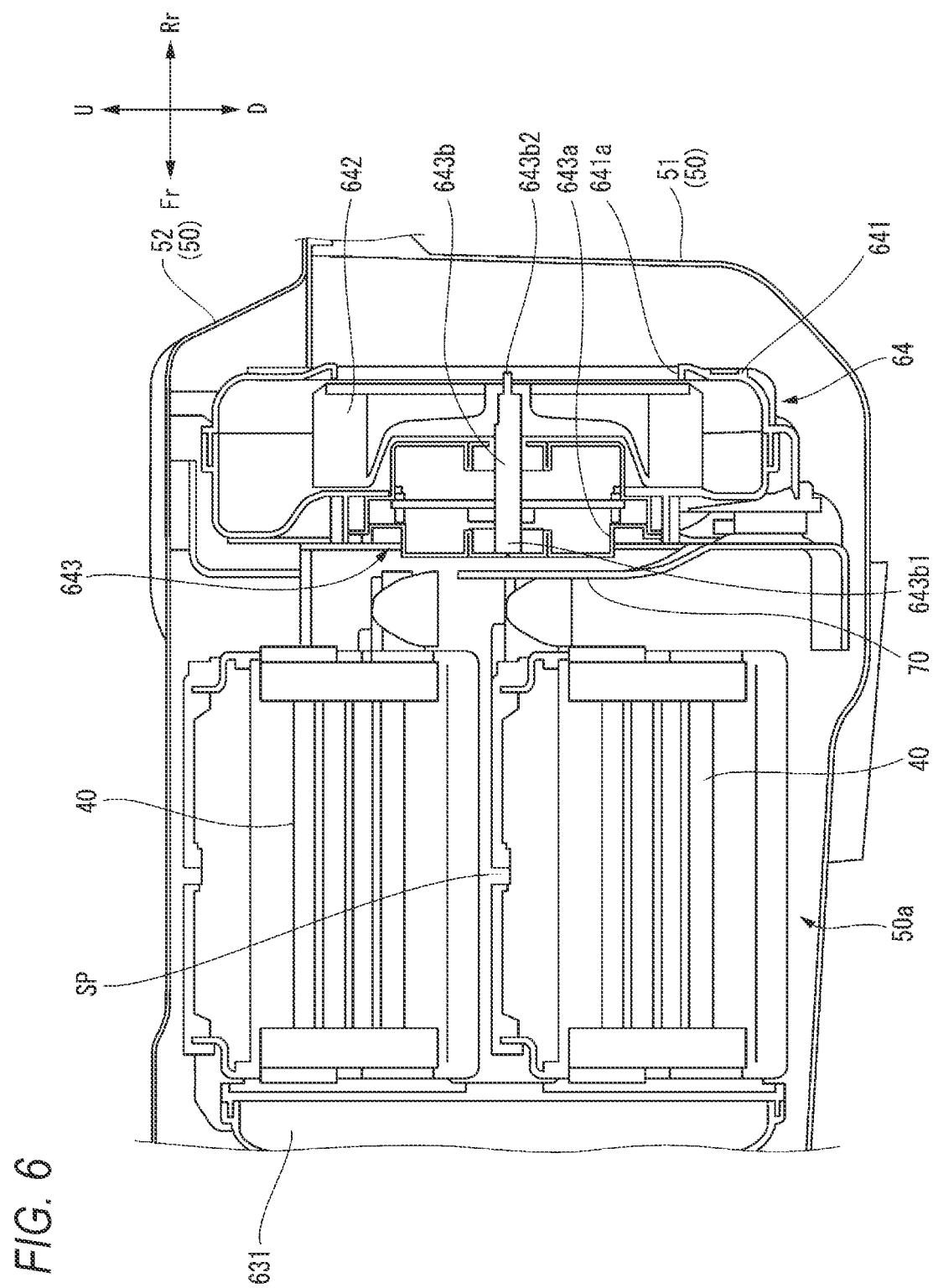
FIG. 6 is an enlarged view of the vicinity of an air guide fan in FIG. 3.
Figure 7:
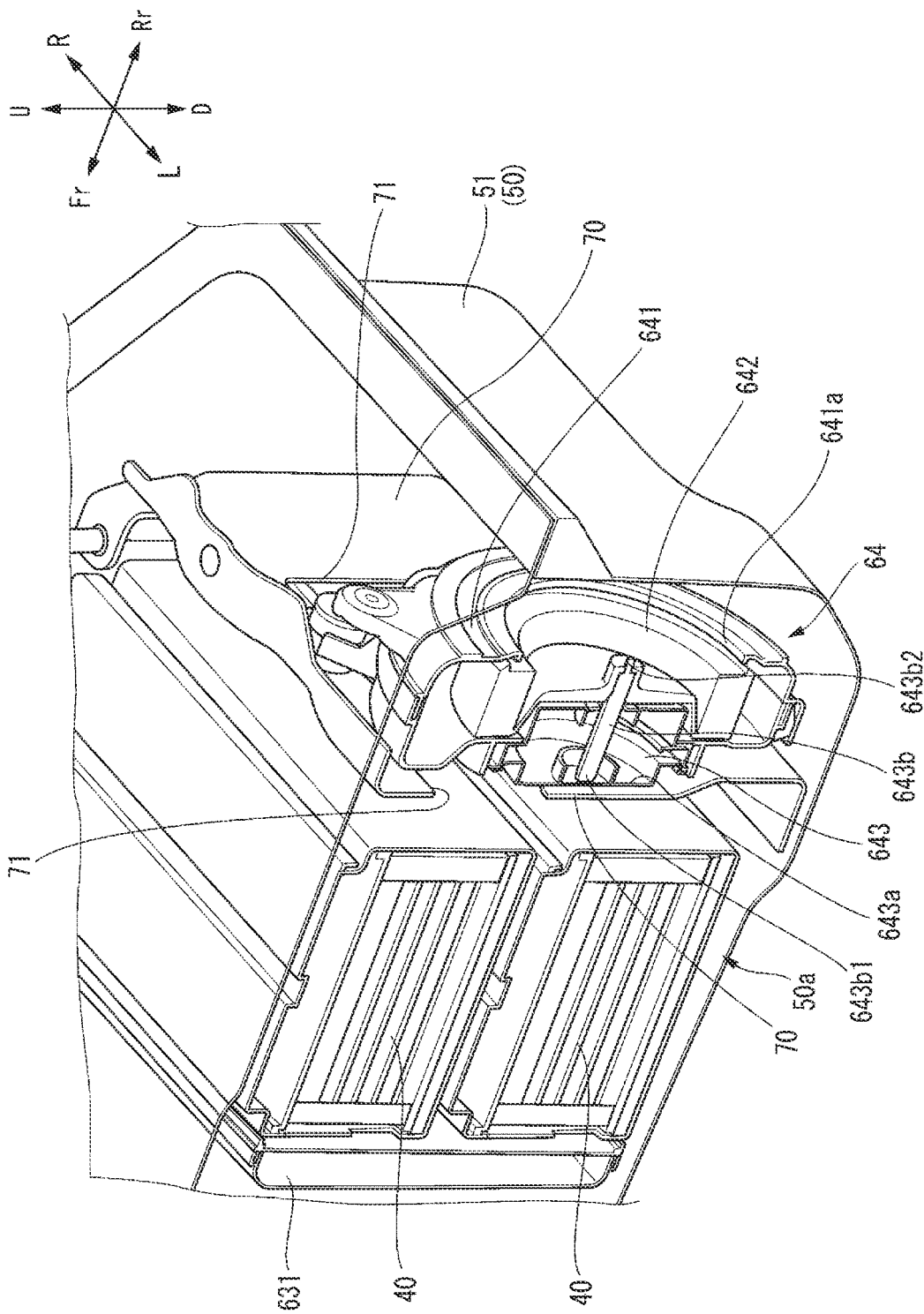
FIG. 7 is an enlarged cross-sectional perspective view of the vicinity of the air guide fan in FIG. 3.

As shown in FIGS. 6 and 7, the air guide fan 64 is disposed behind the four battery modules 40. The air guide fan 64 in the present embodiment is a sirocco fan. The air guide fan 64 includes a fan case 641 including a suction port 641a and an air blow-out port 641b, an impeller 642 rotatably disposed inside the fan case 641, and a fan motor 643 that drives the impeller 642.

The fan case 641 accommodates the impeller 642. The fan case 641 has a substantially cylindrical shape whose central axis is a rotation axis of the impeller 642. The suction port 641a of the fan case 641 is a substantially circular opening centered on the rotation axis of the impeller 642. The air blow-out port 641b of the fan case 641 communicates with the inside of the fan case 641, and extends in a cylindrical shape leftward from an upper end of the fan case 641.

The air guide fan 64 is disposed behind the four battery modules 40, faces the four battery modules 40 in the front-rear direction, and is disposed so that the suction port 641a of the fan case 641 faces rearward.

The fan motor 643 includes a motor housing 643a, a rotor and a stator (not shown) accommodated in the motor housing 643a, and a drive shaft 643b that rotates integrally with the rotor. The drive shaft 643b is rotated integrally with the rotor by a driving force of the fan motor 643 to rotate the impeller 642.

The drive shaft 643b extends in the front-rear direction of the vehicle V. That is, a rotation axis of the drive shaft 643b extends in the front-rear direction of the vehicle V. The drive shaft 643b of the fan motor 643 is disposed at a position overlapping, as viewed from the front-rear direction, the gap portion SP that is formed between the battery modules 40 disposed side by side in the upper-lower direction and extends in the upper-lower direction.

Therefore, even when the vehicle V undergoes collision from behind and the drive shaft 643b relatively moves forward, the drive shaft 643b enters the gap portion SP and does not collide with the battery module 40. Accordingly, even when the vehicle V undergoes collision from behind, the drive shaft 643b can be prevented from colliding with the battery module 40 and damaging the battery module 40.

A front end 643b1 of the drive shaft 643b is disposed inside the motor housing 643a, a tip end of a rear end 643b2 of the drive shaft 643b has a small diameter, and the rear end 643b2 is exposed rearward from the motor housing 643a to the outside of the motor housing 643a.

In this way, even when the vehicle V undergoes collision from behind, the motor housing 643a prevents the drive shaft 643b from relatively moving forward. In addition, since the rear end 643b2 whose tip end has a small diameter faces rearward, that is, faces a direction opposite to the battery module 40, the drive shaft 643b can prevent the rear end 643b2 whose tip end has a small diameter from colliding with the battery module 40 and damaging the battery module 40 even when the vehicle V undergoes collision from behind.

The impeller 642 is connected to the rear end 643b2 of the drive shaft 643b, and is rotated integrally with the drive shaft 643b by the driving force of the fan motor 643. The impeller 642 is provided with, in a cylindrical shape in a circumferential direction of the drive shaft 643b, a plurality of elongated plate-shaped blades extending in an axial direction of the drive shaft 643b. Therefore, the rotation axis of the impeller 642 is along the front-rear direction of the vehicle V.

The air guide fan 64 is disposed so that at least a part thereof is located behind a rear end of a rear wheel RW of the vehicle V in the front-rear direction.

Accordingly, the air guide fan 64 is located further rearward, and thus a length of a path through which noise generated from the air guide fan 64 is emitted from the suction port 641a to the outside through the introduction duct 61 can be increased, so that transmission of the noise of the air guide fan 64 to an occupant of the vehicle V is reduced. As described above, the drive shaft 643b of the fan motor 643 is disposed at the position overlapping the gap portion SP that is formed between the battery modules 40 disposed side by side in the upper-lower direction and extends in the upper-lower direction as viewed from the front-rear direction. Even when the vehicle V undergoes collision from behind, the drive shaft 643b is prevented from colliding with the battery module 40 and damaging the battery module 40. Therefore, it is possible to increase the length of the path through which the noise generated from the air guide fan 64 is emitted from the suction port 641a to the outside through the introduction duct 61 and reduce transmission of the noise of the air guide fan 64 to the occupant of the vehicle V while preventing the drive shaft 643b from colliding with the battery module 40 and damaging the battery module 40 even when the vehicle V undergoes collision from behind.

A plate-shaped bracket 70 extending in the upper-lower direction and the vehicle width direction is provided between the air guide fan 64 and rear surfaces of the four battery modules 40. The bracket 70 is fixed to the case body 51 of the battery case 50. The bracket 70 is provided with a cutout hole 71 to reduce a weight thereof.

The air guide fan 64 is fixed to a rear surface of the plate-shaped bracket 70.

Accordingly, the bracket 70 functions as a reflection plate against the noise generated from the air guide fan 64, the noise that is generated from the air guide fan 64 and flows to the introduction duct 61 through the battery module 40 is reduced, and thus transmission of the noise generated from the air guide fan 64 to the occupant of the vehicle V through the introduction duct 61 is reduced. The noise generated from the air guide fan 64 can be more efficiently diffused into the battery case 50 and attenuated in the battery case 50.

Further, the bracket 70 is interposed between the air guide fan 64 and the battery module 40 in a region overlapping the drive shaft 643b of the fan motor 643 as viewed from the front-rear direction.

Therefore, when the vehicle V undergoes collision from behind, the drive shaft 643b collides with the bracket 70. Accordingly, even when the vehicle V undergoes collision from behind, it is possible to prevent the drive shaft 643b from colliding with the battery module 40 and damaging the battery module 40.

Referring back to FIGS. 3 to 5, the discharge-side air guide member 65 has a cylindrical shape, one end thereof is connected to the air blow-out port 641b of the fan case 641 of the air guide fan 64 and the other end thereof is connected to the discharge-side opening 54 formed in the cover 52 of the battery case 50.

Therefore, air supplied from the supply portion 631 to the front surfaces of the four battery modules 40 is suctioned by the air guide fan 64, flows rearward while cooling the four battery modules 40, and is suctioned from behind into the suction port 641a of the air guide fan 64 facing rearward. The air suctioned into the suction port 641a of the air guide fan 64 is blown out from the air blow-out port 641b of the air guide fan 64, passes through the discharge-side air guide member 65, and is discharged to the outside of the battery case 50 from the discharge-side opening 54 formed in the cover 52 of the battery case 50.

At this time, since the case body 51 and the cover 52 are sealed as described above, the air supplied from the supply portion 631 to the front surfaces of the four battery modules 40 flows to the suction port 641a of the air guide fan 64 without leaking to the outside of the battery case 50 even though no duct is provided to accommodate the four battery modules 40 and connect the supply portion 631 to the suction port 641a of the air guide fan 64. Accordingly, the number of components of the battery pack 30 can be reduced. In addition, since the case body 51 and the cover 52 are sealed, it is possible to reduce leakage of noise generated from the air guide fan 64 from the battery case 50 to the outside.

Since the suction port 641a of the fan case 641 is a substantially circular opening centered on the rotation axis of the impeller 642, noise generated from the air guide fan 64 is easily radiated from the suction port 641*a*. At this time, the one end of the introduction-side air guide member 63 is connected to the introduction duct 61, and the other end of the introduction-side air guide member 63 seals the front surface of the battery module 40. The suction port 641*a* of the fan case 641 faces rearward, that is, faces a direction opposite to the battery module 40 without being directly connected to the battery module 40. Therefore, the noise generated from the air guide fan 64 and flowing to the introduction duct 61 is reduced, and the noise generated from the air guide fan 64 is diffused inside the battery case 50. Accordingly, the noise generated from the air guide fan 64 can be diffused inside the battery case 50, which is a larger space, and can be attenuated in the battery case 50, so that the noise generated from the air guide fan 64 can be attenuated more efficiently without increasing the number of components. In addition, since the noise generated by the air guide fan 64 and flowing to the introduction duct 61 is reduced, transmission of the noise of the air guide fan 64 to the occupant of the vehicle V through the introduction duct 61 can be reduced without increasing the number of components.

In this way, transmission of the noise of the air guide fan 64 to the occupant can be reduced without increasing the number of components, which can further contribute to improvement in energy efficiency.

The introduction duct 61 is disposed on the battery module 40 whereas the air guide fan 64 is disposed behind the battery module 40, faces the battery module 40 in the front-rear direction, and is disposed so that the suction port 641*a* faces rearward, so that a path through which the noise generated by the air guide fan 64 is emitted from the suction port 641*a* to the outside through the introduction duct 61 can be bent and the length of the path can be increased. Accordingly, radiation, from the introduction duct 61 to the outside, of the noise generated from the air guide fan 64 can be reduced, and thus transmission of the noise of the air guide fan 64 to the occupant of the vehicle V can be reduced without providing any dedicated component for reducing transmission of the noise of the air guide fan 64 to the occupant. Therefore, transmission of the noise of the air guide fan 64 to the occupant of the vehicle V can be reduced without increasing the number of components.

The discharge duct 62 has a cylindrical shape extending in the front-rear direction through a left side of the battery case 50, a rear end of the discharge duct 62 is connected to the discharge-side opening 54 formed in the cover 52 of the battery case 50, and a front end of the discharge duct 62 forms a discharge port 62*a*. The discharge port 62*a* of the discharge duct 62 is located below the rear seat RS and faces forward.

Therefore, air discharged to the outside of the battery case 50 from the discharge-side opening 54 formed in the cover 52 of the battery case 50 passes through the discharge duct 62 and is discharged from the discharge port 62*a* to the vehicle compartment CB of the vehicle V.

<Detailed Structure of Introduction Duct>

The introduction duct 61 is disposed so that the intake port 61*b* is located rightward of a center of the vehicle V in the vehicle width direction, and the supply port 61*c* is provided leftward of the intake port 61*b*.

The air flow path 610 formed in the introduction duct 61 includes a front-rear extension portion 611 that extends rearward in the front-rear direction from the intake port 61*b*, a first bent portion 612 that is bent upward from a rear end of the front-rear extension portion 611 and extends in the upper-lower direction, a second bent portion 613 that is bent outward in the vehicle width direction (rightward in the vehicle width direction in the present embodiment) from an upper end of the first bent portion 612 and extends in the vehicle width direction, a crank portion 614 that is bent rearward from a vehicle width direction outer end of the second bent portion 613 and extends in the front-rear direction, and a left-right extension portion 615 that is bent inward in the vehicle width direction (leftward in the vehicle width direction in the present embodiment) from a rear end of the crank portion 614 and extends in the vehicle width direction with an end thereof forming the supply port 61*c*.

At least a part of the crank portion 614 of the introduction duct 61 is located above upper ends of the two battery modules 40 disposed on the upper side, an upper end of the suction port 641*a* of the air guide fan 64, and an upper end of the intake port 61*b* of the introduction duct 61.

Therefore, it is possible to further increase the length of the path through which the noise generated from the air guide fan 64 is emitted from the suction port 641*a* to the outside through the introduction duct 61, and the path through which the noise generated from the air guide fan 64 is emitted from the suction port 641*a* to the outside through the introduction duct 61 is a path that is abutted against the introduction duct 61 and bent in the upper-lower direction. Accordingly, transmission of the noise of the air guide fan 64 to the occupant of the vehicle V can be reduced.

Further, the introduction duct 61 is formed so that a lower end of the crank portion 614 is located above the upper end of the intake port 61*b*.

Accordingly, when a lower portion of the vehicle V is immersed in water, even if water enters the air flow path 610 of the introduction duct 61 from the intake port 61*b*, the crank portion 614 dams the entry of water, and thus the battery module 40 can be prevented from being immersed in water.

The introduction duct 61 is disposed so that the cross member 12 extending in the left-right direction of the vehicle body frame 10 of the vehicle V is located below the crank portion 614.

Accordingly, a space around the cross member 12 can be effectively used for disposition of the crank portion 614.

As described above, the air flow path 610 formed in the introduction duct 61 includes the second bent portion 613 bent rightward at a downstream side of the front-rear extension portion 611 in the air flow path 610, and the supply port 61*c* is provided leftward of the intake port 61*b*.

Accordingly, since the air flow path 610 formed in the introduction duct 61 is bent in the left-right direction, it is possible to further increase the length of the path through which the noise generated from the air guide fan 64 is emitted from the suction port 641*a* to the outside through the introduction duct 61, and the path through which the noise generated from the air guide fan 64 is emitted from the suction port 641*a* to the outside through the introduction duct 61 is a path that is abutted against the introduction duct 61 and bent in the left-right direction. Accordingly, transmission of the noise of the air guide fan 64 to the occupant of the vehicle V can be reduced.

Although the embodiment of the present invention has been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, respective constituent elements in the above embodiment may be freely combined without departing from the gist of the invention.

In the present description, at least the following matters are described. In parentheses, the corresponding constituent elements and the like in the above embodiment are shown as an example, but the present invention is not limited thereto.

(1) A vehicle battery pack (battery pack 30) including:
a battery module (battery module 40) in which a plurality of battery cells are stacked;
a battery case (battery case 50) configured to accommodate the battery module; and
a battery cooling mechanism (battery cooling mechanism 60) configured to cool the battery module, in which
the vehicle battery pack is mounted on a vehicle (vehicle V) provided with at least one seat (rear seat RS),
the battery case is mounted behind the seat,
the battery cooling mechanism includes:
an introduction duct (introduction duct 61) configured to introduce air from an outside of the battery case into the battery case:
an air guide member (introduction-side air guide member 63) disposed inside the battery case and configured to guide, to the battery module, the air introduced into the battery case from the introduction duct:
an air guide fan (air guide fan 64) configured to blow air inside the battery case; and
a discharge duct (discharge duct 62) configured to discharge the air inside the battery case to the outside of the battery case.
the air guide fan includes a fan motor (fan motor 643), a fan case (fan case 641) including a suction port (suction port 641a) and an air blow-out port (air blow-out port 641b), and an impeller (impeller 642) rotatably disposed inside the fan case and configured to be rotated by a driving force of the fan motor,
the introduction duct is disposed in front of the battery module,
the air guide member is provided so that one end thereof is connected to the introduction duct and another end thereof seals a front surface of the battery module, and
the air guide fan is disposed behind the battery module, faces the battery module in a front-rear direction, and is disposed so that the suction port faces rearward.

According to (1), the air guide member is provided so that the one end is connected to the introduction duct and the other end seals the front surface of the battery module, and the suction port of the fan case faces rearward, that is, faces a side opposite to the battery module. Therefore, noise generated from the air guide fan and flowing to the introduction duct is reduced, and the noise generated from the air guide fan is diffused inside the battery case. Accordingly, the noise generated from the air guide fan can be diffused inside the battery case, which is a larger space, and can be attenuated in the battery case, so that the noise generated from the air guide fan can be attenuated more efficiently without increasing the number of components. In addition, since the noise generated by the air guide fan and flowing to the introduction duct is reduced, transmission of the noise of the air guide fan to an occupant through the introduction duct can be reduced without increasing the number of components.

(2) The vehicle battery pack according to (1), in which
the battery case includes a case body (case body 51) that is configured to accommodate the battery module and whose upper portion is opened, and a cover (cover 52) covering an opening of the upper portion of the case body, and
the case body and the cover are sealed.

According to (2), since the case body and the cover are sealed, air supplied to the battery module flows to the suction port of the air guide fan without leaking to the outside of the battery case even though no duct is provided to accommodate the battery module.

Accordingly, the number of components of the vehicle battery pack can be reduced. In addition, since the case body and the cover are sealed, it is possible to reduce leakage of the noise generated from the air guide fan from the battery case to the outside.

(3) The vehicle battery pack according to (1), in which
the introduction duct includes:
an air guide portion (air guide portion 61a) having a cylindrical shape and forming an air flow path (air flow path 610):
an intake port (intake port 61b) formed at one end of the air guide portion and configured to take in air from the outside of the battery case; and
a supply port (supply port 61c) formed at another end of the air guide portion and configured to discharge, from the air guide portion, the air taken in from the intake port to supply the air into the battery case,
the air flow path formed by the air guide portion includes a bent portion (first bent portion 612) bent upward and extending in an upper-lower direction, and a crank portion (crank portion 614), at a downstream side of the bent portion in the air flow path, being bent rearward and extending in the front-rear direction, and
the introduction duct is formed so that at least a part of the crank portion is located above an upper end of the battery module, an upper end of the suction port of the air guide fan, and an upper end of the intake port.

According to (3), it is possible to further increase a length of a path through which the noise generated from the air guide fan is emitted from the suction port to the outside through the introduction duct, and the path through which the noise generated from the air guide fan is emitted from the suction port to the outside through the introduction duct is a path that is abutted against the introduction duct and bent in the upper-lower direction. Accordingly, transmission of the noise of the air guide fan to the occupant of the vehicle can be reduced.

(4) The vehicle battery pack according to (3), in which
the introduction duct is formed so that a lower end of the crank portion is located above the upper end of the intake port.

According to (4), when a lower portion of the vehicle is immersed in water, even if water enters the air flow path of the introduction duct from the intake port, the crank portion dams the entry of water, and thus the battery module can be prevented from being immersed in water.

(5) The vehicle battery pack according to (4), in which
the introduction duct is disposed so that a cross member (cross member 12) extending in a left-right direction of a vehicle body frame (vehicle body frame 10) of the vehicle is located below the crank portion.

According to (5), a space around the cross member can be effectively used for disposition of the crank portion.

(6) The vehicle battery pack according to (1), in which
the introduction duct includes:
an air guide portion (air guide portion 61a) having a cylindrical shape and forming an air flow path (air flow path 610);

an intake port (intake port 61*b*) formed at one end of the air guide portion and configured to take in air from the outside of the battery case: and a supply port (supply port 61*c*) formed at another end of the air guide portion and configured to discharge, from the air guide portion, the air taken in from the intake port to supply the air into the battery case, the air flow path formed by the air guide portion includes a front-rear extension portion (front-rear extension portion 611) extending in the front-rear direction from the intake port, and an outer bent portion (second bent portion 613), at a downstream side of the front-rear extension portion in the air flow path, being bent to one side in a vehicle width direction, and the supply port is provided on another side in the vehicle width direction with respect to the intake port of the air guide portion.

According to (6), since the air flow path formed in the introduction duct is bent in the left-right direction, it is possible to further increase the length of the path through which the noise generated from the air guide fan is emitted from the suction port to the outside through the introduction duct, and the path through which the noise generated from the air guide fan is emitted from the suction port to the outside through the introduction duct is a path that is abutted against the introduction duct and bent in the left-right direction. Accordingly, transmission of the noise of the air guide fan to the occupant of the vehicle can be reduced.

(7) The vehicle battery pack according to any one of (1) to (6), in which at least two of the battery modules are disposed side by side in the upper-lower direction in the battery case.

a gap portion (gap portion SP) extending in the upper-lower direction is formed between the battery modules disposed side by side in the upper-lower direction, the fan motor includes a drive shaft (drive shaft 643*b*) configured to rotate by the driving force of the fan motor to rotate the impeller, and the drive shaft extends in the front-rear direction and is disposed at a position overlapping the gap portion as viewed from the front-rear direction.

According to (7), even when the vehicle undergoes collision from behind and the drive shaft relatively moves forward, the drive shaft enters the gap portion and does not collide with the battery module. Accordingly, even when the vehicle undergoes collision from behind, the drive shaft can be prevented from colliding with the battery module and damaging the battery module.

(8) The vehicle battery pack according to (7), in which at least a part of the air guide fan is disposed behind a rear end of a rear wheel (rear wheel RW) of the vehicle in the front-rear direction.

According to (8), the air guide fan is located further rearward, and thus the length of the path through which the noise generated from the air guide fan is emitted from the suction port to the outside through the introduction duct can be increased, so that transmission of the noise of the air guide fan to the occupant of the vehicle is reduced.

(9) The vehicle battery pack according to (7), in which the air guide fan is fixed to a plate-shaped bracket (bracket 70) extending in the upper-lower direction and the vehicle width direction between the air guide fan and the battery module.

According to (9), the bracket functions as a reflection plate against the noise generated from the air guide fan, the noise that is generated from the air guide fan and flows to the introduction duct through the battery module is reduced, and thus transmission of the noise generated from the air guide fan to the occupant of the vehicle through the introduction duct is reduced. The noise generated from the air guide fan can be more efficiently diffused into the battery case and attenuated in the battery case.

(10) The vehicle battery pack according to (9), in which the bracket is interposed between the air guide fan and the battery module in a region overlapping the drive shaft as viewed from the front-rear direction.

According to (10), when the vehicle V undergoes collision from behind, the drive shaft collides with the bracket. Accordingly, even when the vehicle undergoes collision from behind, the drive shaft can be prevented from colliding with the battery module and damaging the battery module.

(11) The vehicle battery pack according to any one of (1) to (6), in which the fan motor includes a motor housing (motor housing 643*a*) and a drive shaft (drive shaft 643*b*) configured to rotate by the driving force of the fan motor to rotate the impeller, a front end (front end 643*b*1) of the drive shaft is disposed inside the motor housing, and a rear end (rear end 643*b*2) of the drive shaft is exposed from the motor housing backward to outside of the motor housing and is connected to the impeller, and a tip end of the rear end of the drive shaft has a small diameter.

According to (11), even when the vehicle undergoes collision from behind, the motor housing prevents the drive shaft from relatively moving forward. In addition, since the rear end whose tip end has a small diameter faces rearward, that is, faces a direction opposite to the battery module, the drive shaft can prevent the rear end whose tip end has a small diameter from colliding with the battery module and damaging the battery module even when the vehicle undergoes collision from behind.

What is claimed is:
1. A vehicle battery pack comprising:
at least one battery module in which a plurality of battery cells are stacked;
a battery case configured to accommodate the at least one battery module; and
a battery cooling mechanism configured to cool the at least one battery module, wherein
the vehicle battery pack is mounted on a vehicle provided with at least one seat,
the battery case is mounted behind the at least one seat,
the battery cooling mechanism includes:
an introduction duct configured to introduce air from an outside of the battery case into the battery case;
an air guide member disposed inside the battery case and configured to guide, to the at least one battery module, the air introduced into the battery case from the introduction duct;
an air guide fan configured to blow the air inside the battery case; and
a discharge duct configured to discharge the air inside the battery case to the outside of the battery case,
the air guide fan includes a fan motor, a fan case including a suction port and an air blow-out port, and an impeller rotatably disposed inside the fan case and configured to be rotated by a driving force of the fan motor,
the introduction duct is disposed in front of the at least one battery module, the air guide member is provided so that one end thereof is connected to the introduction duct and another end thereof seals a front surface of the at least one battery module, the air guide fan is disposed behind the at least one battery module, faces the at least one battery module in a front-rear direction, and is disposed so that the suction port faces rearward, and the air guide fan is fixed to a plate-shaped bracket extending in an upper-lower direction and a vehicle width direction between the air guide fan and the at least one battery module.

2. The vehicle battery pack according to claim 1, wherein the battery case includes a case body that is configured to accommodate the at least one battery module and whose upper portion is opened, and a cover covering an opening of the upper portion of the case body, and the case body and the cover are sealed.

3. The vehicle battery pack according to claim 1, wherein the introduction duct includes:

an air guide portion having a cylindrical shape and forming an air flow path;

an intake port formed at one end of the air guide portion and configured to take in air from the outside of the battery case; and a supply port formed at another end of the air guide portion and configured to discharge, from the air guide portion, the air taken in from the intake port to supply the air into the battery case, the air flow path formed by the air guide portion includes a bent portion bent upward and extending in an upper-lower direction, and a crank portion, at a downstream side of the bent portion in the air flow path, being bent rearward and extending in the front-rear direction, and the introduction duct is formed so that at least a part of the crank portion is located above an upper end of the at least one battery module, an upper end of the suction port of the air guide fan, and an upper end of the intake port.

4. The vehicle battery pack according to claim 3, wherein the introduction duct is formed so that a lower end of the crank portion is located above the upper end of the intake port.

5. The vehicle battery pack according to claim 4, wherein the introduction duct is disposed so that a cross member extending in a left-right direction of a vehicle body frame of the vehicle is located below the crank portion.

6. The vehicle battery pack according to claim 1, wherein the introduction duct includes:

an air guide portion having a cylindrical shape and forming an air flow path;

an intake port formed at one end of the air guide portion and configured to take in air from the outside of the battery case; and a supply port formed at another end of the air guide portion and configured to supply the air taken in from the intake port into the battery case, the air flow path formed by the air guide portion includes a front-rear extension portion extending in the front-rear direction from the intake port, and an outer bent portion, at a downstream side of the front-rear extension portion in the air flow path, being bent to one side in a vehicle width direction, and the supply port is provided on another side in the vehicle width direction with respect to the intake port of the air guide portion.

7. The vehicle battery pack according to claim 1, wherein the at least one battery module comprises two battery modules disposed side by side in an upper-lower direction in the battery case, a gap portion extending in the upper-lower direction is formed between the two battery modules disposed side by side in the upper-lower direction, the fan motor includes a drive shaft configured to rotate by the driving force of the fan motor to rotate the impeller, and the drive shaft extends in the front-rear direction and is disposed at a position overlapping the gap portion as viewed from the front-rear direction.

8. The vehicle battery pack according to claim 7, wherein at least a part of the air guide fan is disposed behind a rear end of a rear wheel of the vehicle in the front-rear direction.

9. The vehicle battery pack according to claim 7, wherein the bracket is interposed between the air guide fan and the at least one battery module in a region overlapping the drive shaft as viewed from the front-rear direction.

10. The vehicle battery pack according to claim 1, wherein the fan motor includes a motor housing and a drive shaft configured to rotate by the driving force of the fan motor to rotate the impeller, a front end of the drive shaft is disposed inside the motor housing, and a rear end of the drive shaft is exposed from the motor housing backward to outside of the motor housing and is connected to the impeller, and a tip end of the rear end of the drive shaft has a small diameter.

* * * * *